United States Patent
Marsaud et al.

[11] Patent Number: 5,804,758
[45] Date of Patent: Sep. 8, 1998

[54] PYROTECHNIC HOT-GAS GENERATOR FOR SIDE PROTECTION BAG

[75] Inventors: Benoit Marsaud, Neaufles Saint Martin; Christian Perotto, Ballancourt; Daniel Duvacouier, Bordeaux, all of France

[73] Assignee: SNC Livbag, Vert Le Petit, France

[21] Appl. No.: 685,029

[22] Filed: Jul. 22, 1996

[30] Foreign Application Priority Data

Aug. 4, 1995 [FR] France .................... 95 09497

[51] Int. Cl.⁶ .................... C06D 5/06; B60R 21/28
[52] U.S. Cl. .................... 102/288; 102/287; 280/741
[58] Field of Search .................... 102/288, 289; 280/741, 742

[56] References Cited

U.S. PATENT DOCUMENTS

| | | | |
|---|---|---|---|
| 1,077,320 | 11/1913 | Walsh | 102/288 |
| 3,418,811 | 12/1968 | Caveny et al. | 60/254 |
| 3,429,264 | 2/1969 | Oversohl et al. | 102/100 |
| 3,813,007 | 5/1974 | Doin et al. | 222/4 |
| 3,882,673 | 5/1975 | Doin et al. | 160/207 |
| 3,926,697 | 12/1975 | Humbert et al. | 149/14 |
| 3,972,545 | 8/1976 | Kirchoff et al. | 280/735 |
| 4,094,248 | 6/1978 | Jacobson | 102/100 |
| 4,627,352 | 12/1986 | Brachert et al. | 102/290 |
| 4,846,368 | 7/1989 | Goetz et al. | 222/3 |
| 4,876,962 | 10/1989 | Olsson | 102/288 |
| 5,016,914 | 5/1991 | Faigle et al. | 280/741 |
| 5,022,674 | 6/1991 | Frantom et al. | 280/741 |
| 5,031,932 | 7/1991 | Frantom et al. | 280/741 |
| 5,112,079 | 5/1992 | Haland et al. | 280/730 |
| 5,160,163 | 11/1992 | Castagner et al. | 280/740 |
| 5,468,012 | 11/1995 | Mihm | 280/728.2 |
| 5,566,973 | 10/1996 | Green et al. | 280/728.2 |

FOREIGN PATENT DOCUMENTS

| | | |
|---|---|---|
| 93/09977 | 5/1993 | European Pat. Off. . |
| 404 572 | 5/1994 | European Pat. Off. . |
| 611 346 | 1/1996 | European Pat. Off. . |
| 2 682 374 | 4/1993 | France . |
| 1 242 053 | 6/1967 | Germany . |
| 1 061 390 | 3/1967 | United Kingdom . |

*Primary Examiner*—Peter A. Nelson
*Attorney, Agent, or Firm*—Pillsbury Madison & Sutro LLP

[57] ABSTRACT

The present invention relates to a gas generator for motor vehicle safety.

The generator (1) comprises a hollow cylindrical body (2) containing an igniter (8), a pyrotechnic charge (20) and a nozzle (16,19). The pyrotechnic charge is in the form of a lobed block perforated with channels (24) which are parallel to the axis of the generator.

The generator (1) is extended by a diffuser (30) which has a lateral vent (33) for discharging the gases.

The generator (1) is particularly suited for inflating side bags for protecting the occupants of a motor vehicle.

9 Claims, 2 Drawing Sheets

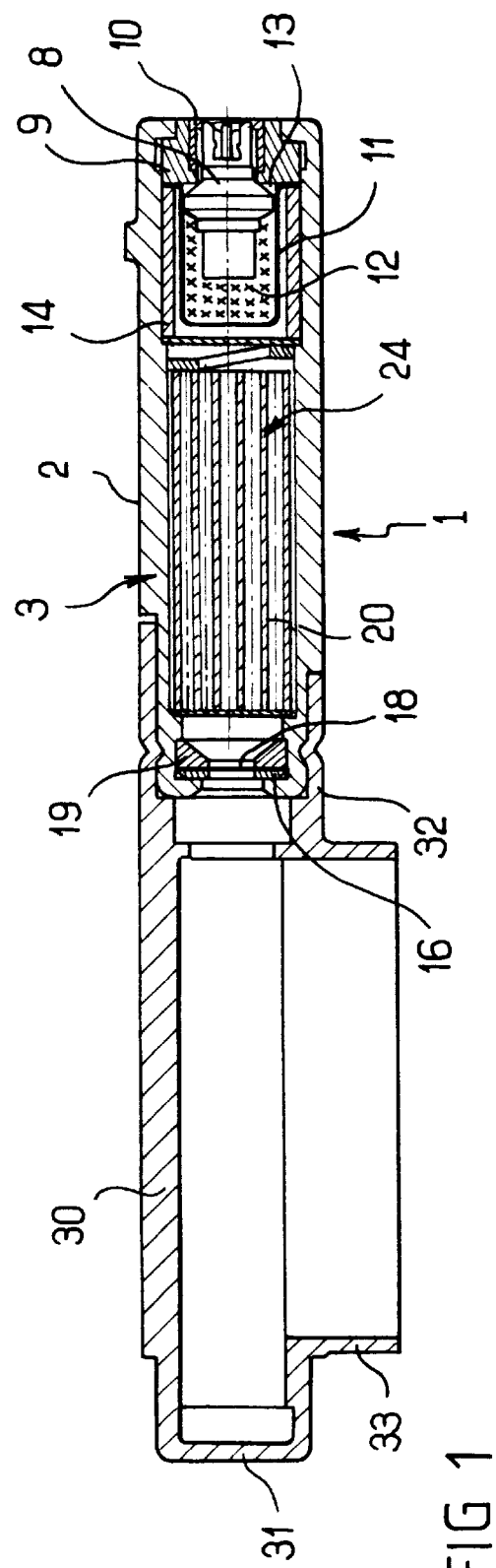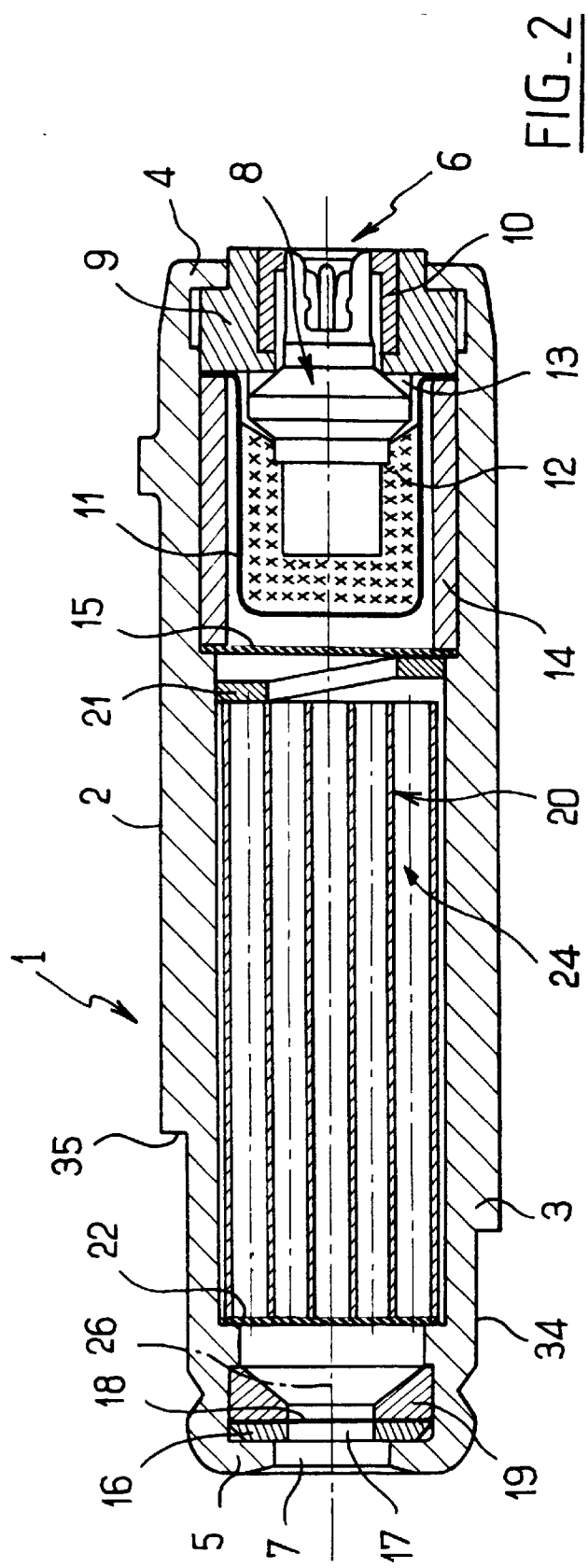

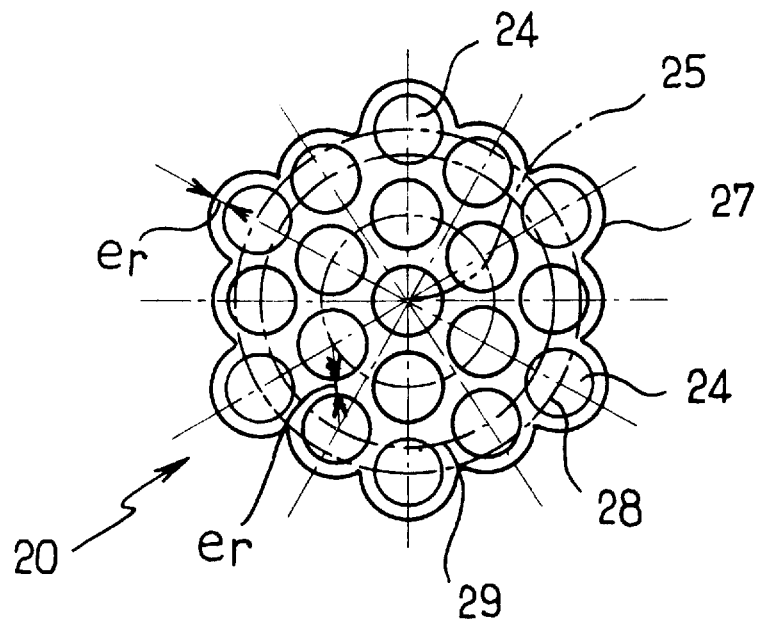
FIG_3
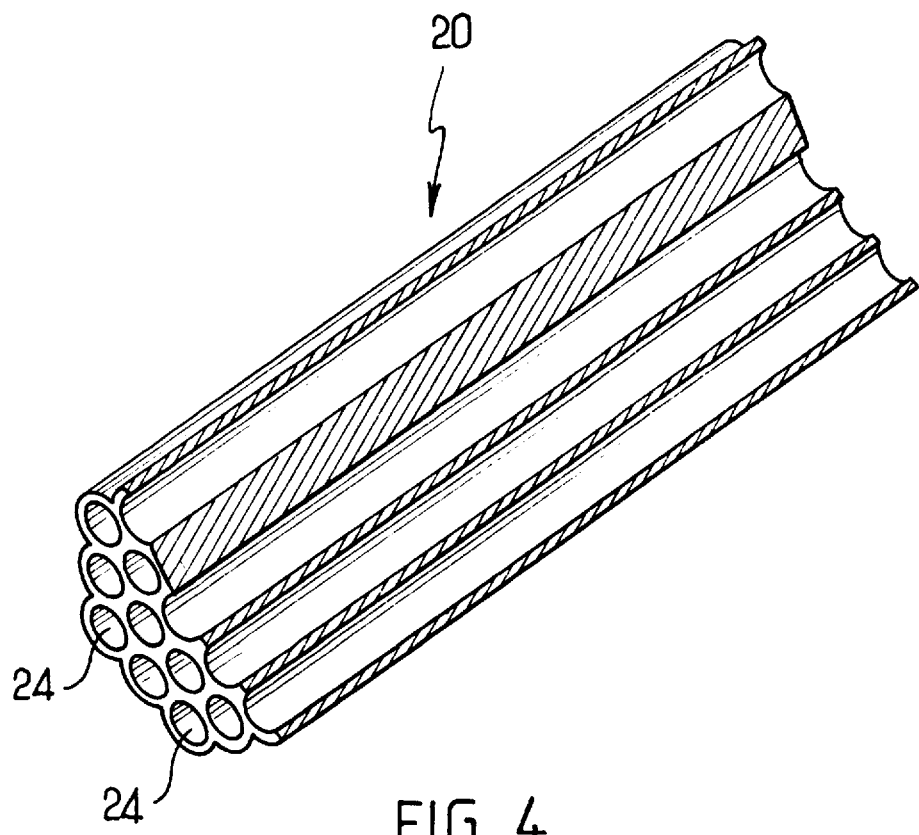
FIG_4

PYROTECHNIC HOT-GAS GENERATOR FOR SIDE PROTECTION BAG

The present invention relates to the field of protection, in the event of collision, of the occupants of a motor vehicle by means of a protection bag inflated by gases originating from a pyrotechnic gas generator.

More precisely, the invention relates to a pyrotechnic hot-gas generator used especially for inflating a side bag for protecting the occupants of a motor vehicle.

For more than about twenty years it has been proposed to protect, in the event of frontal impacts, the occupants, driver and passengers, of a motor vehicle by means of inflatable bags placed in front of them.

Various pyrotechnic types of generator have been proposed for this purpose.

For example, in French Patents 2 116 948 and 2 116 949, which correspond to U.S. Pat. Nos. 3,882,673 and U.S. Pat. No. 3,813,007, pyrotechnic gas generators have been proposed in which the gases originate partly from the combustion of a pyrotechnic gas charge and partly from the vaporization of a liquid contained in a vessel placed near the said pyrotechnic charge. Such generators have a relatively complex structure which results in their being costly to manufacture.

A person skilled in the art has therefore turned towards generators in which all of the gases originate from the combustion of a solid charge.

Thus U.S. Pat. No. 5,160,163 proposes a pyrotechnic gas generator, of circular general shape, designed more especially for the protection of the driver of a motor vehicle, and European Patent EP-B-0 404 572 proposes a pyrotechnic gas generator, of elongate cylindrical general shape, designed more especially for the protection of the front passenger of a motor vehicle.

More recently, a person skilled in the art has also become concerned with the problem of the protection of the occupants of a motor vehicle by using an inflatable bag in the event of side, and no longer frontal, impacts. This problem and its solution by means of side bags placed in the back rest of the vehicle seats is addressed, for example, in U.S. Pat. No. 5,112,079.

Since then, it has unfortunately been found that the conventional pyrotechnic generators for frontal bags are completely unsuitable for ensuring a correct and reliable inflation of the side protection bags.

In fact, while, in order to be reliable, a frontal protection bag must be capable of being inflated within a time period close to 50 milliseconds after the detection of the impact, and therefore requires a pyrotechnic charge which burns completely within this period of time, a side protection bag must be capable of being inflated within a time period close to 10 milliseconds after the detection of the impact.

Now, with the solutions known hitherto, a person skilled in the art does not have at his or her disposal a generator and a pyrotechnic charge which guarantee a complete combustion within a time period of 10 milliseconds.

Generators with a liquid reservoir or generators in which the charge is in the form of a solid block intrinsically have response times that are too long.

Generators in which the charge consists of a bundle of hollow strands of gas-generating powder do not make it possible to guarantee, in the pressure and temperature conditions required for a combustion that is as fast as this, the mechanical behaviour of the bundle and hence the reliability of the response of the generator.

Finally, generators in which the pyrotechnic composition is in the form of grains of powder or of pellets, as described, for example, in the abovementioned patent EP-B-0 404 572, do not allow the combustion law to be completely controlled and, with solutions of this type, a person skilled in the art is not protected from the risks of explosion of the generator.

A person skilled in the art is therefore searching for pyrotechnic generators guaranteeing a reliable inflation of the side bags for protecting the occupants of a motor vehicle.

The objective of the present invention is precisely to propose a pyrotechnic gas generator which makes it possible to control completely, and hence to guarantee, a law of complete combustion within a time period of the order of 10 milliseconds, and hence to answer the problem which is posed.

The invention therefore relates to a pyrotechnic hot-gas generator comprising a hollow cylindrical tubular body which has a side wall ending in two substantially planar faces and in which the length of the generatrices is greater than its external diameter, the said body containing especially an igniter and a gas-generating solid pyrotechnic charge, the said generator being characterized in that:

i) the said side wall is solid over the whole length of each of its generatrices and in that each of the said planar faces has an opening, ii) the said igniter is fixed in one of the said openings, iii) a nozzle, itself closed by a closure cap is fixed in the other opening, iv) the said pyrotechnic charge is in the form of a block perforated with a plurality of channels which are parallel to the axis of the said block, which itself is placed between the igniter and the nozzle so that the said channels are parallel to the axis of the generator body.

According to a first preferred embodiment of the invention the block of pyrotechnic charge has radial thicknesses to burn which are all identical and has a geometry permitting simultaneous ignition both via the internal surfaces of the said channels and via the external side surface of the block.

Preferably, by being situated in a plane which is transverse to the block, the centres of the peripheral channels are not equidistant from the centre of the said block, but are distributed alternately, in this plane, on two separate concentric circles.

Also preferably the said channels are cylindrical channels.

According to a second preferred embodiment of the invention the pyrotechnic charge consists either of a pyrotechnic composition based on nitrocellulose and nitroglycerine, or of a plastic-bonded pyrotechnic composition including essentially a silicone resin as binder and a mixture of ammonium perchlorate and of sodium nitrate as energetic base.

The choice of these pyrotechnic compositions makes it possible to employ very simple generators without a filtration chamber.

According to a first preferred alternative form the pyrotechnic charge is separated from the igniter by a metal separating grid.

According to a second preferred alternative form the pyrotechnic charge rests on a spring, itself bearing on the separating grid.

According to a third preferred embodiment of the invention the generator is extended, on the side of the body where the nozzle is fixed, by a hollow cylindrical diffuser which includes:

i) a closed end, ii) an open end which is attached to the end of the generator body which carries the nozzle, iii) a side vent or side holes for discharging the gases.

The invention also relates to the use of such a generator for inflating a side bag for protecting the occupants of a motor vehicle.

The very simple structure of the generator, combined with the particular geometry of the block, allows a person skilled in the art complete and utter control of the combustion law of the block, which burns simultaneously over its whole height in radial parallel layers starting from all its ignition surfaces. Taking into account the rate of combustion of the pyrotechnic composition, the choice of the uniform radial thickness to burn thus makes it possible to guarantee a complete combustion of the charge in a time period of 10 milliseconds without any risk of transition to a detonation. The choice of the height of the charge determines the quantity of gas provided by the generator.

The fact that the various functional components of the generator: igniter, charge and nozzle, are placed in the direction of the gas flow reduces the pressure drops to a minimum and promotes the operation of the generator, and especially the speediness of ignition.

The operating pressure of a generator according to the ignition will generally be close to 20 MPa, i.e. 200 bar.

The preferred embodiment of the invention is described below with reference to FIGS. 1 to 4.

FIG. 1 shows, seen in section, a generator according to the invention equipped with its diffuser.

FIG. 2 shows, seen in section, solely the generator according to the invention.

FIG. 3 is a front view of a pyrotechnic charge block which can be employed within the scope of the present invention.

FIG. 4 is a view in perspective, partly exploded, of the block shown in FIG. 3.

Referring more particularly to FIGS. 1 and 2, it is seen that a pyrotechnic hot-gas generator 1 according to the invention comprises a hollow cylindrical body 2 in which the length L of the generatrices is greater than its external diameter D. The ratio of the length of the generatrices to the external diameter will be preferably between 3 and 4. The body 2 thus has a side wall 3 which ends in two substantially planar faces 4 and 5.

According to a first characteristic of the invention the said side wall 3 is solid over the whole length of each of its generatrices and each of the planar faces 4 or 5 has an opening 6 or 7.

The body 2 thus has only two openings, each placed at one of the ends of the said body. The body 2 is made of a metal which can be subjected to a crimping operation, for example a stainless steel or a zinc and aluminium alloy of the "Zamak" type.

An igniter 8 is fixed in the opening 6 presented by the said hollow body 2. The igniter 8 is carried by an igniter-carrier 9 which is fixed by crimping in the end of the body 2, the end of the wall 3 which is folded down forming the planar face 4.

The igniter 8 may be a percussion igniter or an electrical igniter, as shown in the figures. In this latter case a collar 10 can, if necessary, ensure the electrical protection of the igniter. The igniter 8 is surrounded by a metal hood 11 capable of bursting, which contains an ignition powder 12 like, for example, a powder of the boron/potassium nitrate type.

A seal 13 is inserted between the igniter 8 and the igniter-carrier 9, which itself bears against a cylindrical wedging ring 14 bearing against an internal shoulder presented by the side wall 3. A metal grid 15 separates the ignition compartment thus formed from the remainder of the generator, which comprises the actual combustion chamber.

This combustion chamber ends in a nozzle placed facing the opening 7 of the body 2 of the generator 1.

This nozzle consists of a metal component 16 which has a central orifice 17 closed by a closure cap 18 capable of being ruptured and by a convergent metal cone 19. The nozzle is fixed in the opening 7 of the generator body by crimping of the end of the said body; the end of the side wall 3 which is folded down forming the planar face 5.

A solid gas-generating pyrotechnic charge 20 is placed in the combustion chamber thus formed.

The said charge is in the form of a block of uniform section. This block 20 preferably rests on a spring 21, itself bearing on the separating grid 15. This block is advantageously wedged on the side of the nozzle 16, 19 by a metal grid 22 bearing against an internal shoulder presented by the side wall 3.

The pyrotechnic charge block (20) will now be described in detail, reference being made more especially to FIGS. 3 and 4.

According to an essential characteristic of the invention the block 20 is perforated with a plurality of channels 24 parallel to the axis 25 of the said block, which itself is placed between the igniter 8 and the nozzle 16, 19 so that the said channels 24 are parallel to the axis 26 of the generator body. Thus the channels 24 are placed facing the igniter 8 in order that the ignition of the block may be ensured by all the internal surfaces of the channels 24 and over the whole height of the latter.

In order to guarantee a complete reliability of the combustion law the pyrotechnic charge block 20 has radial thicknesses "er" to burn which are all identical, with a geometry permitting a simultaneous ignition via the internal surfaces of the said channels 24 and via the external side surface 27 of the block.

It is for this reason that, according to a preferred embodiment of the invention, when seen in a plane which is transverse to the block 20, the centres of the peripheral channels are not all equidistant from the centre 25 of the said block but are distributed alternately, in this plane, on two concentric but separate circles 28 and 29.

This geometry, which is shown in FIGS. 3 and 4, differs from the known traditional geometry in the case of the multiperforated lobed blocks and described, for example, in U.S. Pat. No. 1,077,320. Such a block 20 will preferably comprise 19 channels in all, including a central channel. The said channels 24 will also preferably be cylindrical channels, as shown in the figures.

The blocks exhibiting the geometry required for the present invention will advantageously be obtained by extrusion.

Two classes of compositions that can be formed by extrusion are preferred within the scope of the present invention.

The first class consists of the gas-generating compositions based on nitrocellulose and nitroglycerine, also known as "dual-base" compositions.

The second class consists of plastic-bonded pyrotechnic compositions essentially including a silicone resin as binder and a mixture of ammonium perchlorate and sodium nitrate as energetic charge.

According to a preferred embodiment of the invention, shown in FIG. 1, the generator 1 is extended, on the side of the body 2 where the nozzle 16, 19 is fixed, by a hollow cylindrical diffuser 30.

This diffuser 30 includes:

i) a closed end 31 ii) an open end 32 which is fixed onto the end of the body 2 of the generator 1, for example by knurling or crimping, facing the outlet orifice 17 of the nozzle 16, 19, iii) a side vent 33 for discharging the gases, onto which the inflatable protection bag is fixed.

This diffuser will also be made of a zinc and aluminium alloy or a steel.

As shown in FIG. 2, the generator 1 will advantageously include a thinned-down end 34, extended by a positioning notch 35 so as to allow easy and reliable fixing of the diffuser 30.

The operation of a generator according to the invention is the following. In the event of collision, a signal emitted by a collision detector results in the firing of the igniter 8 which lights the ignition powder 12. The combustion gases from the powder 12 cause the hood 11 to burst and they surround the external surface of the block 20 as well as the internal surfaces of the channels 24, thus resulting in the ignition of the block 20 over all the contact surfaces, this being over the whole height of the block 20.

Since the thickness to burn "er" has been determined for this purpose as a function of the rate of burning of the composition forming the block 20, it is thus possible to ensure the complete combustion of the block 20 in less than 10 milliseconds without risks of explosion.

When the pressure in the combustion chamber reaches the rupture value of the closure cap 18, the latter breaks and the gases enter the diffuser 30 to inflate the bag fixed on the vent 33.

A generator according to the invention is thus particularly well suited for inflating a side bag for protecting the occupants of a motor vehicle.

The examples which follow illustrate a possibility of implementation of the invention without limiting its scope.

EXAMPLE 1

A generator-diffuser unit in accordance with that shown in FIG. 1 was produced. The characteristics of this unit were the following:

| generator: | length | 92 mm |
|---|---|---|
| | external diameter | 24 mm |
| | internal diameter | 16 mm |
| | axial ignitor marketed by Davey Bickford | |
| | nozzle: closure cap calibrated at 8 MPa (80 bar) | |
| diffuser: | length | 114 mm |
| | chinmeys | |
| | length | 84 mm |
| | width | 10 mm |
| pyrotechnic charge: | composition: nitrocellulose-nitroglycerine (60:40) dual-base powder | |
| | height | 44 mm |
| | mass | 5 g |
| | channels: 19 cylindrical channels of 2.4 mm internal diameter. | |
| | radial thickness to burn | 0.25 mm |

This unit was combined with an inflatable bag of 12-litre volume and resulted in a satisfactory operation.

The firing results in a 10-litre chamber were the following:

operating time: 9.5 milliseconds (time for 90% of the maximum pressure), maximum pressure: 0.420 MPa, i.e. 4.20 bar.

EXAMPLE 2

Example 1 was reproduced, using a pyrotechnic charge exhibiting the following characteristics:

| composition: | |
|---|---|
| silicone binder: | 20 parts by weight |
| ammonium perchlorate: | 45 parts by weight |
| sodium nitrate: | 35 parts by weight |
| height: | 44 mm |
| mass: | 6 g |
| channels: | 19 cylindrical channels of 1.6 mm internal diameter. |
| thickness to be burnt: | 0.46 mm |

The results of firing in a 10-litre chamber were the following:

operating time: 9.1 milliseconds (time for 90% of the maximum pressure), maximum pressure: 0.493 MPa, i.e 4.93 bar.

We claim:

1. Pyrotechnic hot-gas generator (1) comprising a hollow cylindrical body (2) which has a side wall (3) ending in two substantially planar faces (4, 5) and in which the length (L) of the generatrices is greater than its external diameter (D), the said body containing especially an igniter (8) and a gas-generating solid pyrotechnic charge (20), characterized in that:

i) the said side wall (3) is solid over the whole length of each of its generatrices and each of the planar faces (4, 5) has an opening (6, 7), ii) the said igniter (8) is fixed in one of the said openings (6), iii) a nozzle (16, 19), itself closed by a closure cap (18), is fixed in the other opening (7), iv) the said pyrotechnic charge is in the form of a block perforated with a plurality of channels (24) which are parallel to the axis (25) of the said block, which itself is placed between the igniter (8) and the nozzle (16, 19) so that the said channels (24) are parallel to the axis (26) of the generator body, v) in the same transverse plane, the centres of the peripheral channels of the block (20) are not all equidistant from the centre (25) of the said block but are distributed alternately, in this plane, on two separate concentric circles (28, 29), and vi) the pyrotechnic charge comprises a material selected from the group consisting of a pyrotechnic composition based on nitrocellulose and nitroglycerine, and a plastic-bonded pyrotechnic composition essentially including a silicone resin as binder and a mixture of ammonium perchlorate and sodium nitrate as energetic charge.

2. Generator according to claim 1, characterized in that the pyrotechnic charge block (20) has radial thicknesses (er) to burn which are all identical, with a geometry permitting simultaneous ignition via the internal surfaces of the said channels and via the side surface of the block.

3. Generator according to claim 1, characterized in that it is extended, on the side of the body (2) where the nozzle (16, 19) is fixed, by a hollow cylindrical diffuser (30).

4. Generator according to claim 1, characterized in that the said channels (24) are cylindrical channels.

5. Generator according to claim 3, characterized in that the said diffuser (30) includes:

i) a closed end (31), ii) an open end (32) which is fixed onto the end of the body (2) of the generator, which carries the nozzle (16, 19), iii) a side vent (33) for discharging the gases.

6. Generator according to claim 3, characterized in that the said diffuser (30) includes:

i) a closed end (31), ii) an open end (32) which is fixed onto the end of the body (2) of the generator, which carries the nozzle (16, 19), iii) side holes for discharging the gases.

7. Generator according to claim 1, characterized in that the pyrotechnic charge (20) is separated from the igniter (8) by a metal separating grid (15).

8. Generator according to claim 7, characterized in that the pyrotechnic charge (20) rests on a spring (21), itself bearing on the separating grid (15).

9. The method of inflating a side bag for protecting the occupants of a motor vehicle which comprises utilizing a pyrotechnic hot-gas generator according to claim 1 to inflate said bag.

* * * * *